United States Patent
Farley

(10) Patent No.: US 11,897,096 B2
(45) Date of Patent: Feb. 13, 2024

(54) EXPANDED-STRETCH RETAINING DEVICE WITH EXPANDED SIZE RANGE

(71) Applicant: D. Gray Farley, Huntington Beach, CA (US)

(72) Inventor: D. Gray Farley, Huntington Beach, CA (US)

(*) Notice: Subject to any disclaimer, the term of this patent is extended or adjusted under 35 U.S.C. 154(b) by 173 days.

(21) Appl. No.: 17/348,456

(22) Filed: Jun. 15, 2021

(65) Prior Publication Data
US 2022/0395968 A1 Dec. 15, 2022

(51) Int. Cl.
 B25B 23/00 (2006.01)
 F16J 15/32 (2016.01)
 B25B 21/02 (2006.01)

(52) U.S. Cl.
 CPC ........ B25B 23/0035 (2013.01); F16J 15/32 (2013.01); B25B 21/02 (2013.01)

(58) Field of Classification Search
 CPC ....... B25B 23/0035; B25B 21/02; F16J 15/32
 USPC .... 81/121.1; 403/324, 378, 408.1, 356, 517, 403/379.2; 279/97; 411/517
 See application file for complete search history.

(56) References Cited

U.S. PATENT DOCUMENTS

| | | | |
|---|---|---|---|
| 1,265,341 A | 4/1917 | Keller | |
| 2,110,397 A | 1/1937 | Kangas | |
| 2,304,038 A | 5/1940 | Thompson | |
| 2,464,381 A | 3/1949 | Donaldson et al. | |
| 2,837,831 A | 3/1955 | Gates | |
| 3,549,160 A | 12/1970 | Etskorn | |
| 4,266,453 A | 5/1981 | Farley | |
| 4,304,500 A | 12/1981 | Faulk | |
| 4,477,096 A | 10/1984 | Wallace et al. | |
| 4,583,430 A * | 4/1986 | Farley | B25G 3/26 81/177.85 |
| 4,627,761 A * | 12/1986 | Olson | B25B 23/0035 81/177.85 |
| 4,932,293 A | 6/1990 | Goff | |
| 6,076,436 A | 6/2000 | Farley | |
| 7,363,840 B1 * | 4/2008 | Farley | F16D 1/108 81/177.85 |
| 2004/0237730 A1 | 12/2004 | Hirakata | |

* cited by examiner

*Primary Examiner* — Don M Anderson
*Assistant Examiner* — Jason Khalil Hawkins
(74) *Attorney, Agent, or Firm* — Myers Andras Ashman Bisol LLP; Joseph C. Andras

(57) ABSTRACT

A retaining device to secure a socket to an anvil using provided socket holes and anvil hole, including an O-ring and an integral projecting member extending inwardly from the O-ring, the projecting member having a cross-sectional diameter that conforms with the diameter of the holes in the socket and anvil. The O-ring, though integrally formed with the projecting member, is formed at a reduced cross-sectional diameter so that the overall retaining device can be stretched onto a wider range of socket sizes. The preferred projecting member includes a full-length crush gauge that is positioned in at least one of the juxtapositions between the socket holes and the anvil hole.

20 Claims, 9 Drawing Sheets

New Extended-Stretch Ret Ring®
With Full-Length Multi-Intersection Crush-Gauge

1981

1986

2000

2008

Ret Ring®
Improvements Over the Years

| 3/4" Square Drive | |
|---|---|
| (ID) Inner Diameter | Required Ret Ring |
| 1 1/4" | 10005 CG |
| 1 7/16" | 10032 CG |
| 1 5/8" | 10034 CG |
| 1 3/4" | 18708 CG |
| 2" | 18710 CG |
| 2 1/8" | 18715 CG |
| 2 1/4" | 18716 CG |

Need 7 Ret Rings®

| 1" Square Drive | |
|---|---|
| (ID) Inner Diameter | Required Ret Ring |
| 1 3/4" | 10008 CG |
| 2" | 10010 CG |
| 2 1/8" | 10015 CG |
| 2 1/4" | 10016 CG |
| 2 1/2" | 10017 CG |
| 2 5/8" | 10019 CG |

Need 6 Ret Rings®

| 1 1/2" Square Drive | |
|---|---|
| (ID) Inner Diameter | Required Ret Ring |
| 2 7/8" | 10020 CG |
| 3 3/8" | 10025 CG |
| 3 7/8" | 10030 CG |
| 4 3/8" | 10035 CG |

Need 4 Ret. Rings®

FIG. 8
PRIOR ART

New Extended-Stretch Ret Ring®
With Full-Length Multi-Intersection Crush-Gauge

| 3/4" Square Drive | |
|---|---|
| (ID) Inner Diameter | Required Ret Ring |
| 1 1/4" | ESR Ring No. 1 |
| 1 7/16" | |
| 1 5/8" | ESR Ring No. 2 |
| 1 3/4" | |
| 2" | |
| 2 1/8" | |
| 2 1/4" | |

Only Need Two Ret Rings®

| 1" Square Drive | |
|---|---|
| (ID) Inner Diameter | Required Ret Ring |
| 1 3/4" | ESR Ring No. 3 |
| 2" | |
| 2 1/8" | |
| 2 1/4" | |
| 2 1/2" | |
| 2 5/8" | |

Only Need One Ret Ring®

FIG. 10

Fig. 11 1"-Drive PRIOR ART — Many Ret Rings® Required

Fig. 12 1"-Drive — Fewer Ret Rings® Required

US 11,897,096 B2

EXPANDED-STRETCH RETAINING DEVICE WITH EXPANDED SIZE RANGE

FIELD OF THE INVENTION

This invention relates generally to the field of retaining devices adapted for securing sockets to the anvils of a large pneumatic air gun or other power drive and, more particularly, to an expanded-stretch retaining device with an expanded size range.

BACKGROUND OF THE INVENTION

1. Historic Overview, Current Opportunity, Customer Benefit a. Old System Steel Pin and Neoprene Ring ORIGINAL PROBLEM: neoprene rubber O-rings did not have enough tensile strength to retain a separate steel pin. Centrifugal force of the tool would cause the O-ring to expand and release the steel pin as a flying missile and drop the socket that has hurt workers on the job.

ORIGINAL SOLUTION: One piece RET RINGS® with steel or resin pins were molded together with polyurethane that proved much safer and gained worldwide acceptance. No successful product liability claims since RET RINGS® were introduced in the early 1980s.

b. Current Problem/Opportunity:

But there are two problems that can still cause a safety hazard with large impact sockets on power tools:

i. worn sockets that are hard to determine when to discard.
  ii. determining the size of RET RING® to fit all the different sockets that are going to be used on the job. Each RET RING® must fit properly. There has until now been little or no flexibility of the RET RING® to be used on different sockets with different retention groove diameters on the drive end of the sockets.

There are at least seven RET RINGS® for ¾" square drive and six RET RINGS® for 1" square drive sockets necessary to fit all the different groove diameters of sockets that are commonly available in the marketplace. We have developed a "universal," more flexible one piece RET RING® that can beneficially expand to fit many different groove diameters without sacrificing the holding power needed to keep the crush gauge retention pin at the proper position to safely hold the socket in place on the anvil of the power tool. The following features are present:

i. center holding pin still molded into RET RING® but now longer to always provide proper holding resistance in at least one intersection of the power drive and the socket.
  ii. smaller cross section diameter on the RET RING® that can allow ring expansion during installation of up to 200% to fit the ring on the various groove diameters on different sized sockets. As the ring expands, it has increasing tensile strength to hold the crush pin in proper place of retention. Once applied to a larger socket, the RET RING® should be used on the same socket or large to keep proper fit on the groove.

c. Benefit to the Customers in the Field.

Reduction of thirteen sizes of RET RINGS® needed for most ¾"- and 1"-drive sockets to just three part-numbers of new, universal RET RINGS® w/crush gauge pins. No time wasted trying to provide the correct RET RINGS® for all the sockets being used on different jobs at no sacrifice of safety. Although the c/s diameter of the ring is much smaller and therefore, more flexible to expand over 200% to allow one RET RING® to do the job of six or seven sizes of rings previously used with each corresponding size of ¾' and 1" square drive sockets.

The result is less inventory needed in the field and easier on the job to find RET RINGS® to use on sockets with no sacrifice to operator safety.

2. Detailed History of Prior Art and Applicant's RET RING®

Over the years, various retaining devices have been developed for safely securing power driven sockets to the rotating, high-RPM anvils of pneumatic air guns or power drives. I have been awarded four patents in this area including U.S. Pat. No. 4,266,453 which issued in 1981 and is entitled "Socket Retaining Ring" (the "1981 Patent"), U.S. Pat. No. 4,583,430 which issued in 1986 and is entitled "Metal Shielded Retaining Ring" (the "1986 Patent"), U.S. Pat. No. 6,076,436 which issued in 2000 and is entitled "Retaining Device with Metal Insert" (the "2000 Patent"), and U.S. Pat. No. 7,363,840 which issued in 2008 and is entitled "Retaining Device with High Modulus Polymer Insert and Socket Wear Indicator" (the "2008 Patent"). The disclosures of my foregoing patents are hereby incorporated by reference as if fully set forth herein.

Sockets are often driven clockwise or counterclockwise at very high RPM, very high torque, or both, with the rotating anvil of a power-driven impact tool, aka impact driver or power drive. Prior to the 1981 Patent, power driven sockets were usually secured to the anvil of a power drive, for safety's sake, using a metal pin inserted through bores in the socket that are aligned with a through-hole in the anvil. In an effort to keep the pin in place, a rubber O-ring was then installed around the periphery of the socket within an annular groove intersecting and covering the aligned bores.

As discussed above, the most dangerous aspect of this early prior art approach was the metal pin being violently thrown when the relatively elastic neoprene O-ring was expanded outward by centrifugal force. Moreover, workmen could use the large impact tools by only inserting the pin without using the O-ring. Since the O-ring was separate from the pin, the O-ring could easily get lost, neglected or forgotten.

In addition, normal usage of the tool would cause wear and tear of the inner surface of the socket, causing the socket to fit less tightly onto the square end of the anvil. During operation, the worn-out socket would rotate relative to the anvil, creating a "scissors-like" action. This "scissors-like" movement applied a shearing force at two places between the inner surface of the socket and the anvil: 1) the first juxtaposition defined by the alignment of the first bore of the socket with the first end of the through-hole of the anvil; and 2) the second juxtaposition defined by the alignment of the second bore of the socket with the second end of the through-hole of the anvil. This shearing force occasionally caused the metal pin to be jammed in the bores of the socket, creating a major inconvenience as workers would have to drill out the lodged metal pins.

FIG. 1 is a cutaway perspective view of a power drive 10 having a square-drive anvil 20 that fits into a corresponding drive-hole at the base-end of a socket 30. As further, a socket retaining device "x40" is used to secure the socket 30 to the anvil 20.

FIG. 2 is a simplified cross-sectional views of the anvil 20 and socket 30 of FIG. 1 taken along section lines 2-2. The anvil 20 has an anvil hole 21 with proximal and distal ends, and the socket 30 has two socket holes 31, 31 that align with the anvil hole 21. When properly aligned, as shown, the anvil hole 21 has proximal and distal ends (not separately numbered) that, relative to the side from which the pin is inserted, form near and far interfaces or juxtapositions 25, 26 with the socket holes 31, 31.

The socket's drive hole 35 tends to deform over time because the socket 30 is usually made softer than the anvil 20 so that the tool's life is extended. This rotational movement would occasionally result in shearing forces at the two juxtapositions 25, 26 between the anvil 20 and the socket 90.

FIGS. 3, 4, 5, and 6 show the general construction of my prior art retaining devices 140, 240, 340, 440. In general, similar numbers are used to describe similar components (e.g. O-rings 140 and 240). The illustrated devices correspond generally to the devices shown in my prior patents issued in 1981, 1986, 2000, and 2008. In essence, the drawings collectively show the RET RING® improvements I have conceived of and implemented over the years.

FIG. 3 shows a 1981 retaining device 140 that is comprised of a ring 150 and a projecting member 160 that is flexible, but functions as a pin. The illustrated retaining device 140 is formed as a single, integral assembly made of an elastomeric material, e.g. polyurethane. It beneficially eliminated the danger of using a discrete O-ring to hold a separate metal pin. In other words, a worker could no longer use a metal pin without an O-ring, nor an O-ring without a pin. Furthermore, since the projecting member 160 is formed from the same elastomeric material as the O-ring 150, workers no longer had to struggle with removing metal pins that were jammed within the bores of the anvil 20 or socket 30.

FIG. 4 shows a 1986 retaining device 240 that is comprised of an O-ring 250 and a modified projecting member 260 formed from a long elastomeric base 261 and a metal sleeve 262. The FIG. 4 device 240 added metal sleeve 262 at a far end of the projecting member 260 so that the metal sleeve 262 would be located in the second distal juxtaposition 26 (see FIG. 2), which is the juxtaposition furthest away from the base of the projecting member 260. The metal sleeve 262 improved the safety of the completely polyurethane retaining device disclosed in the 1981 Patent.

FIG. 5 shows a retaining device 340 from 2000 that was formed from an O-ring 350 and a further modified projecting member 360 comprised of a short elastomeric base 361 and a steel pin 262. Unlike the retaining rings 140, 240 that came before it, the steel pin 362 of the retaining ring 340 only extended into the near juxtaposition 25 (see FIG. 2) between the socket 30 and the anvil 20. The short pin device was easier to install, but it did not do well in the marketplace because the operators continued to prefer retaining rings with long pins that passed through both juxtapositions 25, 26. Moreover, when used with worn sockets, the steel pin of the short pin device 340 sometimes fragmented within the juxtaposition and needed to be drilled out.

FIG. 6 shows a retaining device 440 from 2000 that was formed from an O-ring 450 and a further modified projecting member 460 comprised of a long elastomeric base 461 and a special crush gauge 462 that is formed from a suitable high modulus polymer material, or resin, which can be crushed by a significant amount (e.g. as much as 40-50%) while still maintaining some headroom for its socket holding function. The crush gauge 462, as more fully disclosed in the 2008 Patent, has raised ridges (e.g. sharp outermost edges) 475A, 4765B that will beneficially alert the worker to a worn-out socket by being deformed if the socket 30 begins to rotate relative to the anvil 20.

The prior art socket retaining devices 140, 240, 340, 440 offer enhanced safety and have gained worldwide acceptance. In fact, there have been no successful product liability claims since 1980. However, there are two problems that can still cause a safety hazard with large impact sockets 30 on power tools 10:

(1) worn sockets that are hard to determine when to discard: and
(2) determining the size of retaining rings to properly fit all of the different sockets that are going to be used on the job. Each retaining ring must fit properly.

FIG. 7 illustrates a retaining ring storage board that is used by employers to inventory a large number of retaining rings that fit different sized sockets used with ¾", 1", and 1½" drives. In this particular case, the graphic looks like the retaining rings 240 shown in FIG. 4, but the same board is still used to hold other newer retaining rings such as the retaining rings 440 with integral crush gauges shown in FIG. 6.

In use, peg-board style pins are inserted in the two holes above each image of differently sized retaining ring and then the worker brings the base-end of the socket near the board to identify the candidate retaining rings, or choose the appropriate retaining ring based on the model number or the socket manufacturer's model numbers.

FIG. 8 is a table of that shows information gleaned from the storage board shown in FIG. 7 in a different format. As shown, a large number of retaining rings are needed for the different drive sizes, 7 retaining rings for ¾" drive tools, 6 retaining rings for 1" drive tools, and 4 retaining rings for 1½" drive tools. There can be more, but this is typical.

The ¾" and 1" drive sockets are by far the most commons. And, as shown by FIGS. 7 and 8, there are at least seven retaining rings ¾" square drive tools, and six retaining rings for 1" square drive tools. This requires storage of numerous retaining rings and creates some potential for confusion.

There remains a need, therefore, for a retaining device of unique construction that reduces the number of retaining devices that must be made, sold, stored or considered for use, but continues to provide workplace safety.

BRIEF SUMMARY OF THE INVENTION

It is an object of the invention to hold a socket on the square drive or anvil of an impact wrench.

It is a further object of the present invention to provide a wear indicator that indicates excessive wear on sockets.

It is a further object of the present invention to indicate when the socket is too worn for continued use.

It is a further object of the present invention to indicate that the socket is worn in a clear and definitive manner.

It is a further object of the present invention to provide a retaining device that does not fail when compressed owing to the use of a worn socket.

It is a further object of the present invention to provide a retaining device that fits on a wide range of sockets and still accomplished all of the foregoing, thereby reducing the number of retaining devices that need to be manufactured or stored in the field for use.

In a first aspect, the invention may be regarded as a socket retaining device adapted for securing a socket to an anvil of an impact tool where the anvil has an anvil hole and the socket has socket holes that are aligned with the anvil hole when the socket is seated onto the anvil, comprising: a projecting member adapted for insertion into a least one of the socket holes and the anvil hole for securing the socket to the anvil, the projecting member having a first cross-sectional diameter that corresponds to the anvil and socket holes; an O-ring that has an inside diameter and defines a plane, the O-ring adapted for stretching around the socket to hold the projecting member in place, and a joint that connects the projecting member to the O-ring with the projecting member extending radially inward from the O-ring along the plane of the O-ring, wherein the O-ring has a second cross-sectional diameter that is smaller than the projecting member's first cross-sectional diameter along at least part of the O-ring's circumference whereby the O-ring has increased elasticity for stretching around the socket.

In a second aspect, the invention may be regarded as an improved socket retaining device comprising an O-ring that has an inside diameter and defines a plane, a projecting member extending radially inward from the O-ring along the plane of the O-ring, and a joint that connects the projecting member to the O-ring, the socket retaining device adapted for securing (a) a selected one of a plurality of sockets to (b) an anvil of an impact tool, the anvil rotating about an axis of rotation, having a square profile, and an anvil hole that is perpendicular to the axis of rotation, each of the plurality of sockets comprised of a drive-end with (i) a cylindrical base having a base diameter that circumferentially surrounds the axis of rotation, (ii) a square drive aperture with a square profile that fits over and closely surrounds the anvil to mount the socket on the impact tool, (iii) a pair of socket holes that are located on opposite sides of the cylindrical base, perpendicular to the axis of rotation, and aligned with the anvil hole when the socket is mounted on the anvil of the impact tool, and (iv) a peripheral groove on the exterior of the cylindrical base that circumferentially surrounds the axis of rotation, is positioned longitudinally along the axis of rotation so as to align the peripheral groove with the socket holes, and has a groove diameter at a bottom of the peripheral groove that is smaller than the base diameter, the socket being secured to the impact tool's anvil by placing the O-ring around the anvil, installing the socket on the anvil so that the socket holes align with the anvil hole, and then inserting the projecting member into a proximal one of the socket holes to extend the projecting member across at least one of a proximal interface between the proximal one of the socket holes and the anvil hole and a distal interface between a distal one of the socket holes and the anvil hole, the projecting member being secured in position by the inside diameter of the O-ring being stretched over the base diameter of the socket's drive-end base and allowed to contract into the socket's peripheral groove, wherein the plurality of sockets have a plurality of different base diameters and corresponding groove diameters, the improvement comprising:

the projecting member having a first cross-sectional diameter that corresponds to the anvil hole and socket holes of the plurality of sockets; and the O-ring connected to the projecting member having a second cross-sectional diameter that is smaller than the projecting member's first cross-sectional diameter along at least part of the O-ring's circumference whereby the O-ring may be stretched over an increased plurality of sockets having a wider range of base diameters.

The just summarized invention may be better understood by reviewing the preferred embodiment disclosed in the following description and related drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below or illustrated in the figures, of which:

FIG. 8 is a table of that shows information gleaned from the storage board shown in FIG. 7, but in a different format that shows how a large number of retaining rings are typically required, namely 7 retaining rings for sockets used with ¾" square-drive tools, 6 retaining rings for sockets used with 1" square-drive tools, and 4 retaining rings for sockets used with vsquare-drive tools;

FIG. 10 is a table that is comparable to FIG. 8, but shows how the new extended-stretch retaining ring 540 according to the first preferred embodiment of FIG. 9 reduces the number of required retaining rings for ¾" sockets from seven to just two, and reduced the number of required retaining rings for 1" sockets from six to just one;

DETAILED DESCRIPTION OF THE PREFERRED EMBODIMENT

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

Figure 1:
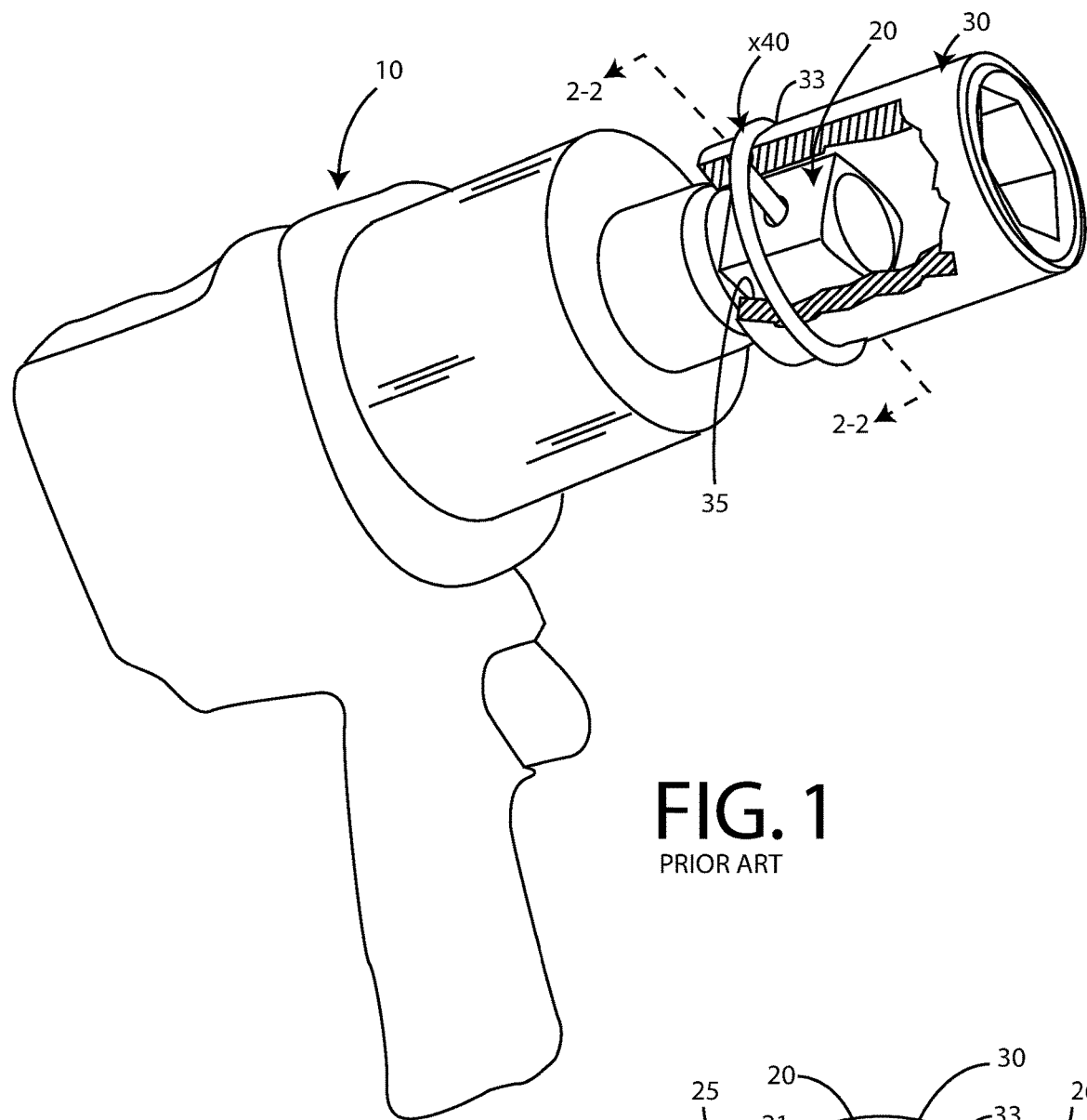
FIG. 1 is a cutaway perspective view of a power drive 10 having a square-drive anvil 20 that fits into a corresponding drive-hole at the base-end of a socket 30, and a retaining device "X" installed thereon.

FIG. 1 is a cutaway perspective view of a large pneumatic air gun 10, sometimes called an impact wrench or power drive, having a square drive anvil 20 (e.g. ¾", 1" and 1½" square drives). Also shown is a socket 30 having a female drive aperture 35 that is sized to closely fit over the anvil 20. Lastly, FIG. 1 shows how a art retaining ring x40 (e.g. 140, 240, 340, etc.) is used to secure the socket 30 to the anvil 20 so that it does not separate from the power drive 10 while stationary or, more importantly, while spinning at high RPM. As explained above in the background section, the retaining ring x40 performs an important safety function. In particular, it reduces the possibility that the operator will trigger the air gun with the socket 30 only partially installed on the anvil 20. Under such unfortunate circumstances, the socket 30 would spin off of the anvil 20 at great velocity and may injure nearby persons or damage property.

Figure 2:
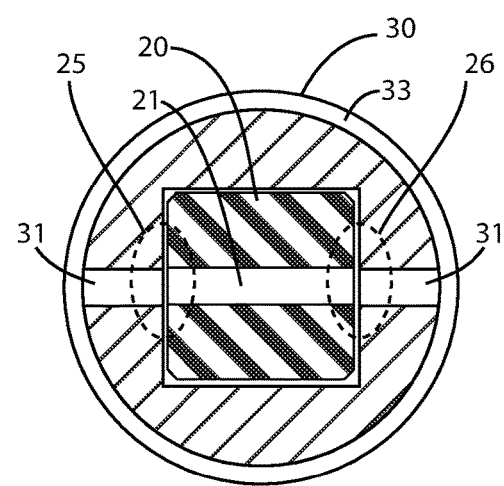
FIG. 2 is a simplified cross-sectional views of the anvil 20 and socket 30 of FIG. 1 taken along section lines 2-2 showing near and far juxtapositions 26, 26.
Figure 3:
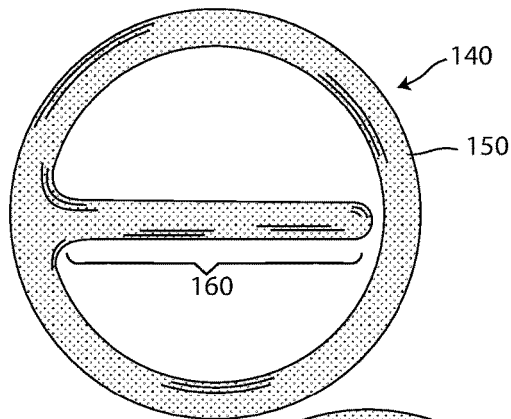
FIGS. 3, 4, 5, and 6 show four prior art retaining devices 140, 240, 340, 440, showing their general construction and their development over time.

FIG. 2 is a simplified cross-sectional views of the anvil 20 and socket 30 of FIG. 1 taken along section lines 2-2. The figure has been simplified by removal of the retaining device x40 shown in FIG. 1. As shown, the anvil 20 has an anvil hole 21 with proximal and distal ends, and the socket 30 has two socket holes 31, 31 that align with the anvil hole 21. When properly aligned, as shown, the anvil hole 21 has proximal and distal ends (not separately numbered) that, relative to the side from which the pin is inserted (left is assumed here), form near and far interfaces or juxtapositions 25, 26 with the socket holes 31, 31.

FIGS. 3, 4, 5, and 6 show four prior art retaining devices 140, 240, 340, 440, showing their general construction and their development over time as discussed somewhat above in the background section. As shown, the prior art retaining devices 140, 240, 340, 440 are each comprised of an O-ring 150, 250, 350, 450, respectively, that has the same cross-sectional diameter of the projecting member 160, 260, 360, 460 which, of course, is sized to fit properly in the socket holes 31, 31 and anvil hole 32. As a result, all of the prior art retaining devices 140, 240, 340, 440 are relatively inelastic and can be stretched to a relatively limited degrees.

In order to use retaining device x40 to secure a socket 30 on an anvil 20, as shown in FIG. 1, the worker: (1) places the O-ring x50 over the anvil 20 and then pushes the socket 30 onto the anvil with the socket oriented so that the socket holes 31, 31 are aligned with the anvil hole 21, (2) pulls on the O-ring x50 near the joint region with the projecting member x60 to insert the distal tip of projecting member x60 through one of the socket holes 31 and into the anvil hole 21, and finally, (3) stretches and rolls the opposite side of the O-ring x50 outward around the socket 30 and slides it along the side of the socket 30 until it contracts into and seats within the socket's peripheral groove 33.

In the prior art retaining devices, the O-ring x50 and the projecting member x60 have the same cross-sectional diameter which is conforms to the cross-sectional diameter of the socket and anvil holes.

The prior art retaining devices x40 are comprised of an O-ring x50 and projecting members x60 of various configuration that have the same cross-sectional diameter and are relatively thick, i.e. about ³⁄₁₆" (~0.1875", or ~4.76 mm). Accordingly, the O-ring x50 is relatively inelastic and each retaining member x40 detrimentally fits around a very limited number of socket ODs. Moreover, focusing on the crush-gauge retaining member 440 of FIG. 6, because of the short partial-length crush gauge 462, some retaining members with a given O-ring ID and a given crush gauge position may fit properly on only one anvil size.

Figure 7:
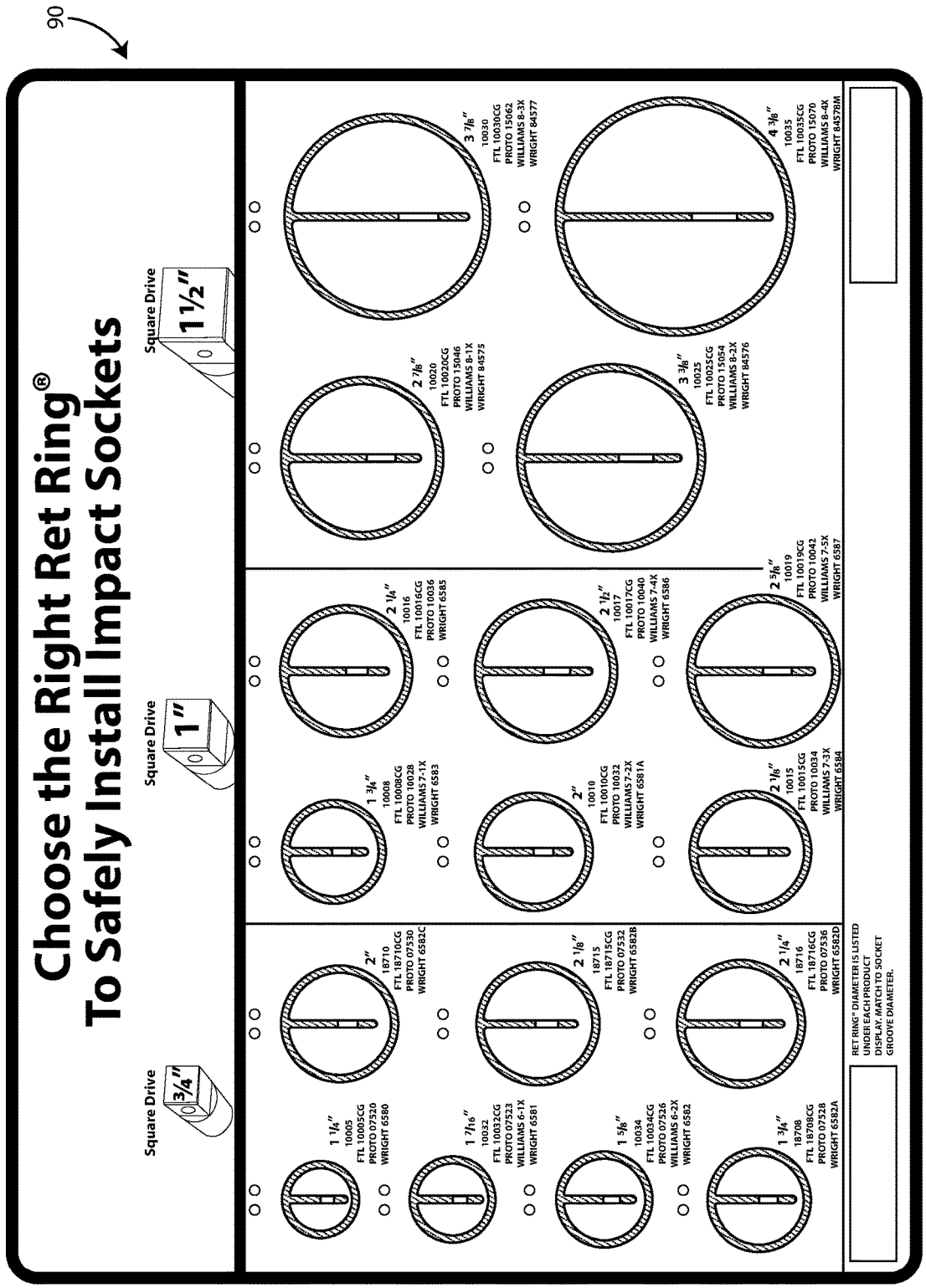
FIG. 7 illustrates a retaining ring storage board that is exemplary of those provided by me and used by users to inventory and select from among a large number of retaining rings that fit different sized sockets used with ¾", 1", and 1½" square-drive tools.

As shown in FIGS. 7 and 8, the applicant makes and sells a large number of highly granular retaining device sizes because each size fits on a particular pair of anvil/socket combinations (note the anvil sizes of ¾", 1" and 1½").

FIG. 7 shows our prior art storage board 90. In order to help users safely choose the correct retaining device, we developed the storage board 90 to hold a wide variety of our retaining devices x40 on metal rods that fit in the two holes above each device image (not shown) and intuitively present the worker with different options in one easy-to-see format. The goal is to give the user information about the device's intended dive size (¾", 1" or 1½"), inner diameter (ID), and part numbers from us or as used by the different tool companies.

This is a great approach, but there remains a need for an improved retaining device with an expanded size range that provides operator safety, but greatly reduces the number of different retaining rings that must be made and stored.

Up to now, the cross-sectional diameter of the O-ring x50 and projection x60 have been equal to one another and about the same as the original metal pin first used long ago, i.e. about ³⁄₁₆" OD. The O-rings x50 are flexible, but within a relatively narrow range due to their cross-sectional diameter or thickness. Accordingly, I must sell and my customers must inventory a relatively large number of different sized retaining devices because the O-ring's overall ID needs to closely fit the drive-end diameter at the base of each socket 30, i.e. so that the O-ring x50 can be stretched around the socket 30 and so that the O-ring x50 will properly contract into the socket's annular groove 33.

Figure 4:
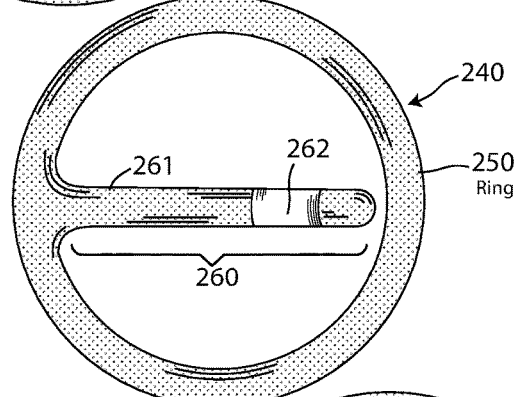
Figure 5:
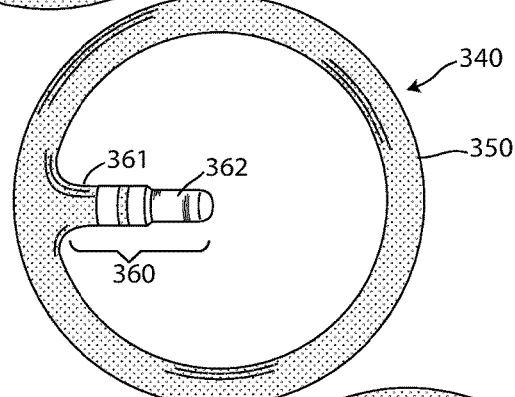
Figure 6:
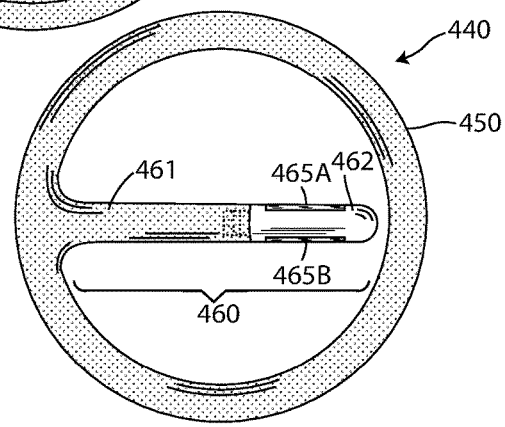

Focusing on the crush-gauge retaining ring 440 of FIG. 4, this granularity has been necessary because the ID for the O-ring 450 of each given retaining member 440 can only stretch around the base diameter of a very narrow range of sockets 30, and also because the projecting member 460 of each retaining member 440 has a short crush gauge 462 at its far end that only interacts with the distal interface 26 (see FIG. 2) between the anvil hole 21 and the distal socket hole 31 and must, therefore, be correctly positioned at the distal interface 26 which varies in location for different square-drive anvil sizes, e.g. ¾", 1" or 1½".

In more detail, FIGS. 7 and 8 show that seven different retaining devices are needed to accommodate the various sockets that one would typically mount on a ¾" anvil, i.e. seven retaining devices with seven different O-ring IDs of 1¼", 1⁷⁄₁₆", 1⅝", 1¾", 2", 2⅛", and 2¼"; and six different retaining devices are needed to accommodate the various sockets that one might mount on a 1" anvil, i.e. six retaining devices with seven different O-ring IDs of 1¾", 2", 2⅛", 2¼", 2½", and 2⅝".

FIGS. 7 and 8, especially 8, shows that while four of the seven retaining devices used with ¾" anvils have the same O-ring ID as four of the six retaining devices used for 1" anvils, namely 1¾", 2", 2⅛", 2¼", the required retaining device for each anvil size has a different model number. This is because each retaining device 440 has a short crush gauge 462 that only interacts with the distal interface 26 between the anvil hole 21 and the distal socket hole 31.

Figure 11:
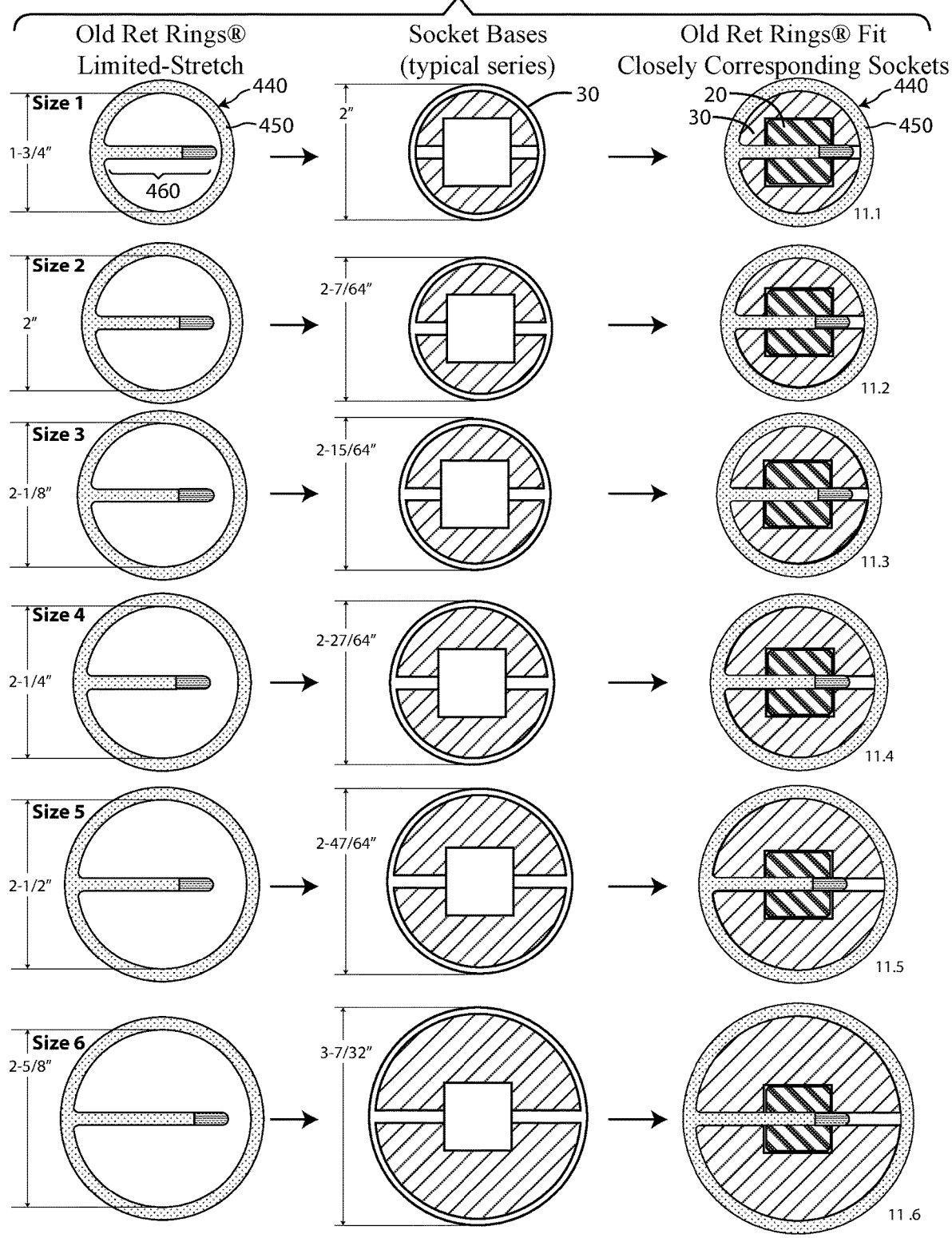
FIG. 11 shows how SIX prior art retaining devices 440 (see FIG. 6) are needed to fit a typical set of 1" sockets 30 due to the fact that the O-ring 450 of each device can only be stretched to a limited degree due to its relatively large cross-sectional diameter which is equal to the cross-sectional diameter of the projecting member 460.

FIG. 11 focuses on the 1" drive circumstance, showing the relative sizes and mounting of the seven different prior art retaining devices 440 on the seven different 1" drive sockets 30, corresponding to assemblies 11.1 to 11.6 in the right-most column.

In other words, due to its relatively inelastic O-ring 450 and projecting member 460 construction, the prior art retaining device 440 requires thirteen different retaining devices to properly secure a given socket to a ¾" or 1" anvil.

Figure 9:
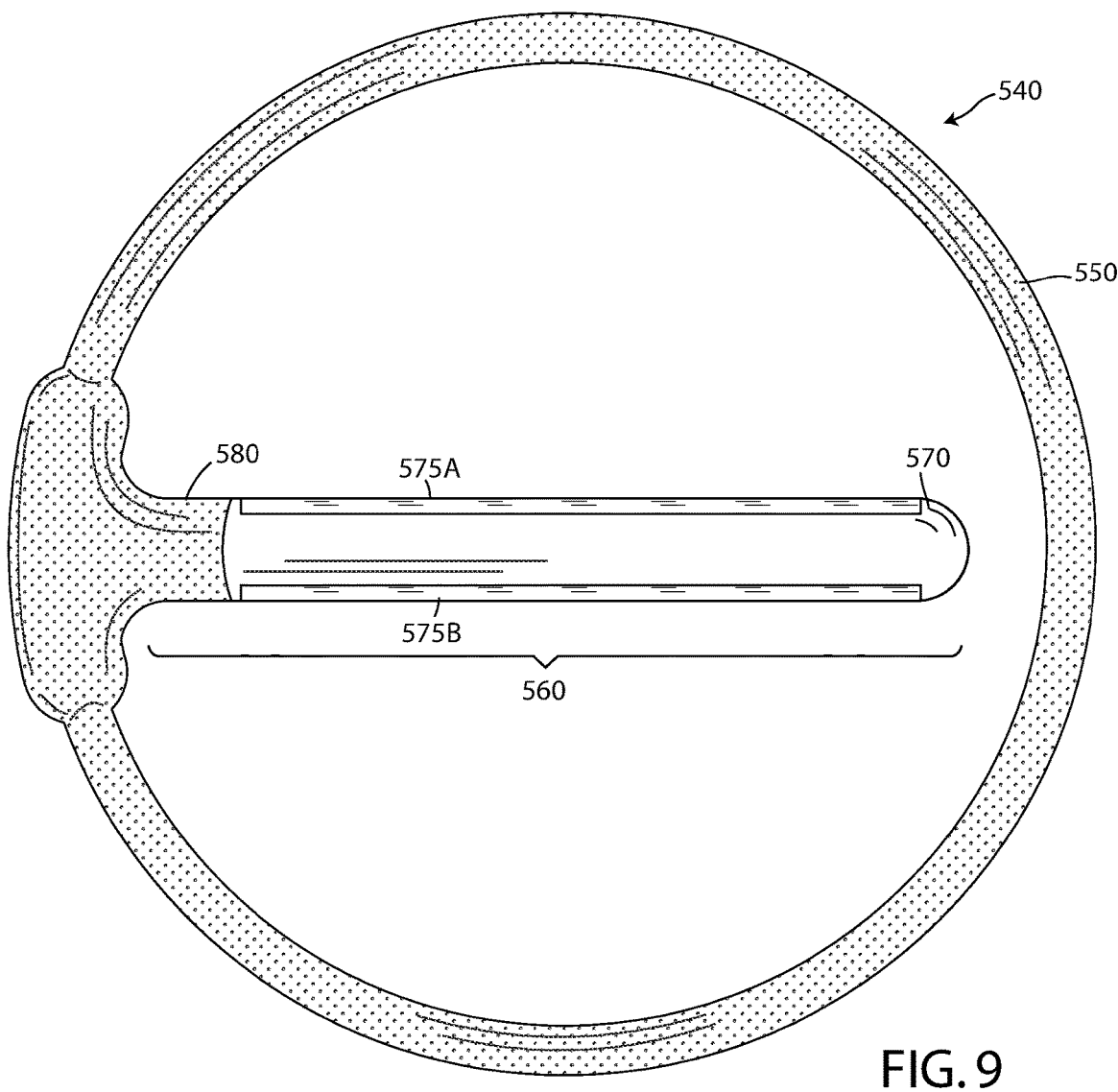
FIG. 9 shows new retaining ring 540 according to a first preferred embodiment of the invention which features an extended-stretch O-ring 550 and projecting member 560 having a full-length multi juxtaposition crush gauge 570 that reach on or both juxtapositions.
Figure 12:
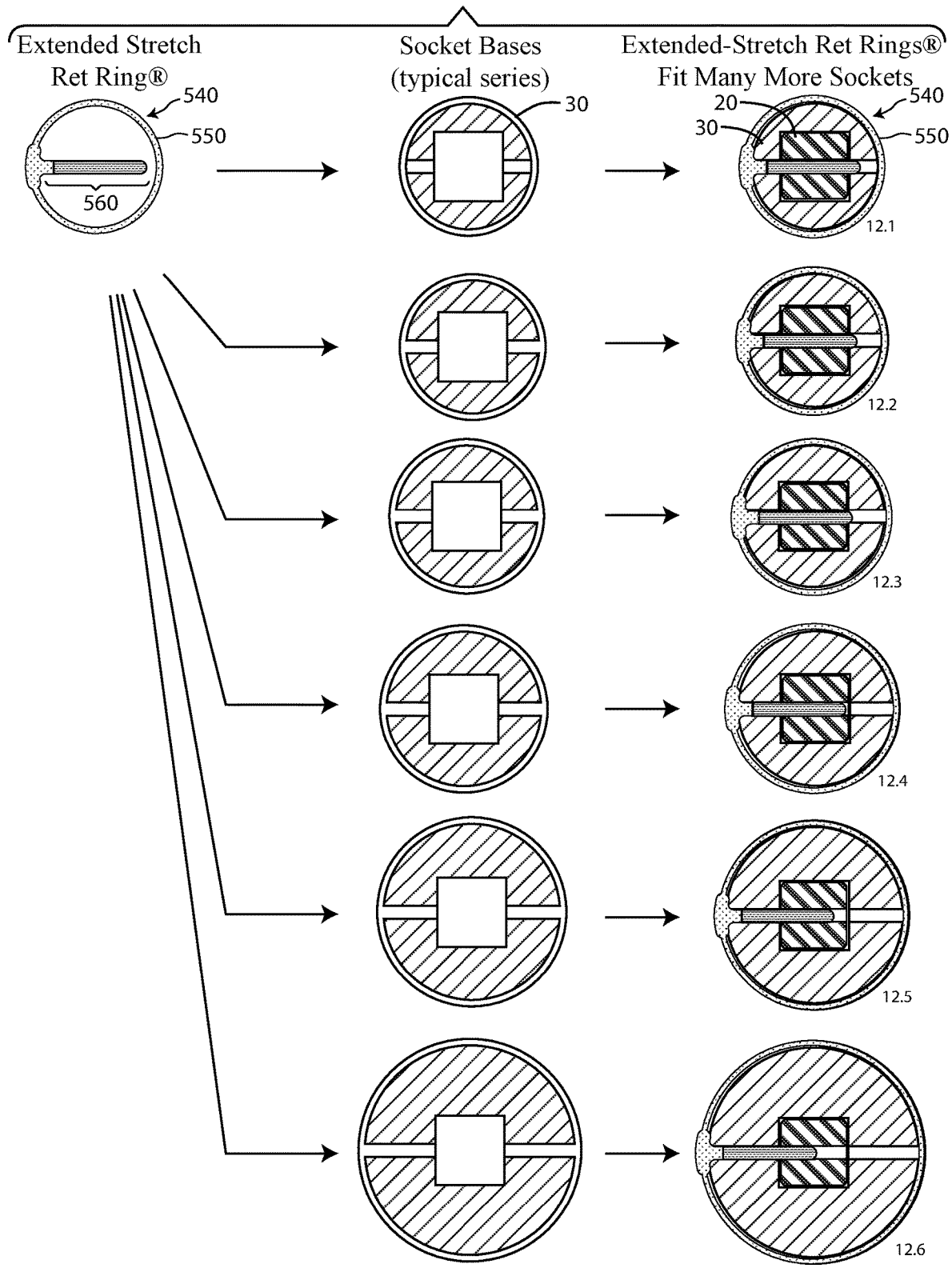
FIG. 12 shows how ONLY ONE extended-stretch retaining devices 540 (see FIG. 9) is needed to fit the same typical set of 1" sockets 30 due to the fact that the O-ring 550 of each device can only be stretched to a limited degree due to its relatively small cross-sectional diameter.
Figure 13:
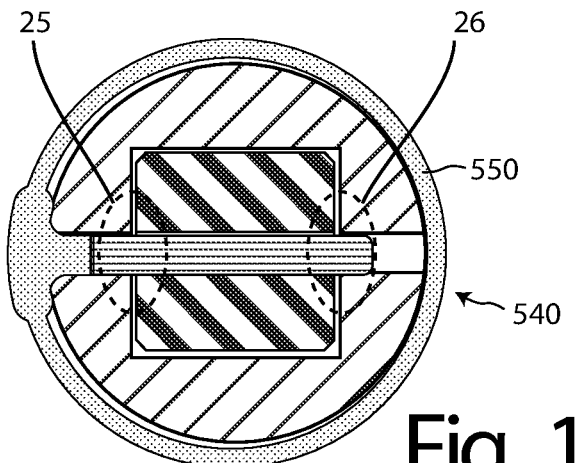
FIG. 13 shows the improved retaining ring 550 lightly stretched onto a smaller socket 30 mounted on an anvil 20 (see e.g. 7.1 of FIG. 12), showing how the full-length crush-gauge 570 is positioned in both the near juxtaposition 25 and the far juxtaposition 26.
Figure 14:
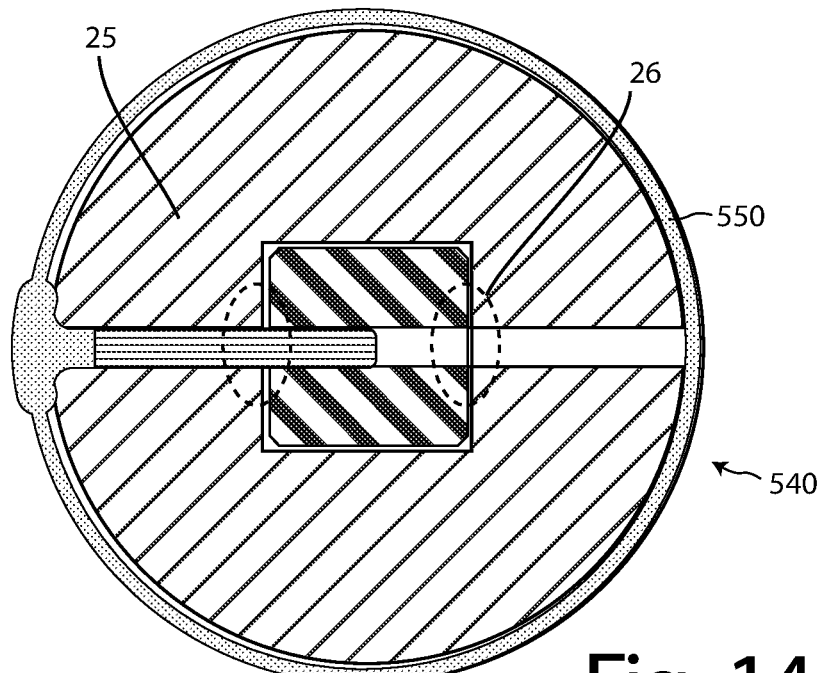
FIG. 14 shows the improved retaining ring 550 fully stretched onto a larger socket 30 mounted on an anvil 20 (see e.g. 7.6 of FIG. 12), showing how the full-length crush-gauge 570 is positioned in the near juxtaposition 25, but not the far juxtaposition 26, but which is sufficient to retain the socket 30 on the anvil 20.

FIG. 9 shows the improved retaining device 540. Here, the device 540 has an O-ring 550 of a reduced cross-sectional diameter relative to that of the projecting member 560, i.e. about ³⁄₃₂" (0.09375", or ~2.38 mm) versus ³⁄₁₆", so that the O ring 550 of each retaining device 540 can be stretched around a much wider range of sockets 30. Moreover, the preferred projecting member 560 is now comprised of a much longer, full-length crush-gauge 570, "full length" in the sense that it ensures that the crush gauge 570 is positioned in at least one of the near and far juxtapositions 25, 26 (see FIG. 2), i.e. in the near juxtaposition 25 only, or in both the near and the far juxtapositions 25, 26 as shown in FIGS. 12, 13, and 14. The projecting member 560 is the "preferred" member, but it is of course possible to use a projecting member like those used in the earlier retaining rings shown in FIGS. 3-5, including, for example, a projecting member that is comprised of a metal portion comparable to the metal sleeve 262 shown in FIG. 4, or the metal pin 362 in FIG. 5.

The full-length crush gauge 570 is formed from a high modulus polymer material, or resin, which can be crushed by a significant amount (e.g. as much as 40-50%) while still maintaining some headroom for its socket holding function. Modulus is the ability to resist stretching or compression. The use of a suitable high modulus material will allow the insert crush gauge 570 to compress up to 50% of its original diameter (while maintaining its tensile strength and holding ability) without breaking. The preferred material previously disclosed in the 2008 Patent is Texin® 270, which the inventor understands to be a polyurethane combined with a resin and can be purchased from distributors for Bayer Material Science LLC.

FIG. 12, which should be closely compared with FIG. 11, shows how just one extended-stretch retaining device 540 can be stretched onto a wide range of sockets and still position the projecting member 560 with full-length crush gauge 570 in both juxtapositions 25, 26 for smaller size socket 30 (e.g. 12.1), or in at least the near juxtaposition 25 (12.6). This is shown in more detail in FIGS. 13 and 14.

The just described embodiment is but one of many possible embodiments of the invention, which invention is described in the following claims.

I claim:

1. A socket retaining device adapted for securing a socket to an anvil of an impact tool where the anvil has an anvil hole and the socket has socket holes that are aligned with the anvil hole when the socket is seated onto the anvil, comprising:
   a projecting member adapted for insertion into a least one of the socket holes and the anvil hole for securing the socket to the anvil, the projecting member having a first cross-sectional diameter that corresponds to the anvil and socket holes;
   an O-ring that has an inside diameter and defines a plane, the O-ring adapted for stretching around the socket to hold the projecting member in place, and
   a joint that connects the projecting member to the O-ring with the projecting member extending radially inward from the plane of the O-ring,
   wherein the O-ring has a second cross-sectional diameter that is smaller than the projecting member's first cross-sectional diameter along at least part of the O-ring's circumference whereby the O-ring has increased elasticity for stretching around the socket.

2. The socket retaining device of claim 1 wherein the O-ring and at least part of the projecting member are a unitary injection molded structure formed from an elastomeric material.

3. The improved socket retaining device of claim 2 wherein the joint connecting the projecting member to the O-ring is a nondestructively inseparable joint.

4. The improved socket retaining device of claim 3 wherein the nondestructively inseparable joint comprises the elastomeric material contained within a connecting region within which the projecting member is connected to the O-ring.

5. The improved socket retaining device of claim 4 wherein the O-ring has the second smaller cross-sectional diameter along substantially all of its circumference.

6. The improved socket retaining device of claim 5 wherein the connecting region is a T-shaped connecting region.

7. The improved socket retaining device of claim 6 wherein the O-ring has the first larger cross-sectional diameter along a small portion of its circumference within the T-shaped connecting region and the second smaller cross-sectional diameter along a remainder of its circumference.

8. The improved socket retaining device of claim 2 wherein the projecting member further comprises a metal portion that is positioned at an interface between a socket hole and the anvil hole.

9. The improved socket retaining device of claim 2 wherein the projecting member further comprises a crush gauge formed from a high modulus polymer material that is positioned at an interface between a socket hole and the anvil hole.

10. The improved socket retaining device of claim 1 wherein the joint connecting the projecting member to the O-ring is a nondestructively separable joint.

11. An improved socket retaining device comprising an O-ring that has an inside diameter and defines a plane, a projecting member extending radially inward from the O-ring along the plane of the O-ring, and a joint that connects the projecting member to the O-ring,
   the socket retaining device adapted for securing (a) a selected one of a plurality of sockets to (b) an anvil of an impact tool, the anvil rotating about an axis of rotation, having a square profile, and an anvil hole that is perpendicular to the axis of rotation,
   each of the plurality of sockets comprised of a drive-end with (i) a cylindrical base having a base diameter that circumferentially surrounds the axis of rotation, (ii) a square drive aperture with a square profile that fits over and closely surrounds the anvil to mount the socket on the impact tool, (iii) a pair of socket holes that are located on opposite sides of the cylindrical base, perpendicular to the axis of rotation, and aligned with the anvil hole when the socket is mounted on the anvil of the impact tool, and (iv) a peripheral groove on the exterior of the cylindrical base that circumferentially surrounds the axis of rotation, is positioned longitudinally along the axis of rotation so as to align the peripheral groove with the socket holes, and has a groove diameter at a bottom of the peripheral groove that is smaller than the base diameter,
   the socket being secured to the impact tool's anvil by placing the O-ring around the anvil, installing the socket on the anvil so that the socket holes align with the anvil hole, and then inserting the projecting member into a proximal one of the socket holes to extend the projecting member across at least one of a proximal interface between the proximal one of the socket holes and the anvil hole and a distal interface between a distal one of the socket holes and the anvil hole, the projecting member being secured in position by the inside diameter of the O-ring being stretched over the base diameter of the socket's drive-end base and allowed to contract into the socket's peripheral groove, wherein the plurality of sockets have a plurality of different base diameters and corresponding groove diameters, the improvement comprising:

the projecting member having a first cross-sectional diameter that corresponds to the anvil hole and socket holes of the plurality of sockets; and the O-ring connected to the projecting member having a second cross-sectional diameter that is smaller than the projecting member's first cross-sectional diameter along at least part of the O-ring's circumference whereby the O-ring may be stretched over an increased plurality of sockets having a wider range of base diameters.

12. The improved socket retaining device of claim 11 wherein the projecting member further comprises a metal portion that is positioned in at least one of the proximal and distal interfaces.

13. The improved socket retaining device of claim 11 wherein the projecting member further comprises a crush gauge formed from a high modulus polymer material that is positioned in at least one of the proximal and distal interfaces.

14. The improved socket retaining device of claim 11 wherein the joint connecting the projecting member to the O-ring is a nondestructively separable joint.

15. The improved socket retaining device of claim 11 wherein the joint connecting the projecting member to the O-ring is a nondestructively inseparable joint.

16. The improved socket retaining device of claim 15 wherein the O-ring and the projecting member are a unitary injection molded structure formed from an elastomeric material and wherein the nondestructively inseparable joint comprises the elastomeric material contained within a connecting region where the O-ring and the projecting member meet.

17. The improved socket retaining device of claim 16 wherein the O-ring has the second smaller cross-sectional diameter along substantially all of its circumference.

18. The improved socket retaining device of claim 17 wherein the connecting region is a T-shaped connecting region.

19. The improved socket retaining device of claim 18 wherein the O-ring has the first larger cross-sectional diameter along a small portion of its circumference within the T-shaped connecting region and the second smaller cross-sectional diameter along a remainder of its circumference.

20. A socket retaining device adapted for securing a socket to an anvil of an impact tool where the anvil has an anvil hole with an anvil hole length and a first diameter and with proximal and distal ends and the socket has proximal and distal socket holes of the same first diameter that are aligned with the proximal and distal ends of the anvil hole to define proximal and distal interfaces, respectively, when the socket is seated onto the anvil, comprising:

a projecting member adapted for insertion into a least one of the socket holes and the anvil hole for securing the socket to the anvil, the projecting member having a first cross-sectional diameter that corresponds to the first diameter of the anvil and socket holes;

an O-ring that has an inside diameter and defines a plane, the O-ring adapted for stretching around the socket to hold the projecting member in place, and a joint that connects the projecting member to the O-ring with the projecting member extending radially inward from the O-ring along the plane of the O-ring, wherein the O-ring has a second cross-sectional diameter that is smaller than the projecting member's first cross-sectional diameter along at least part of the O-ring's circumference whereby the O-ring has increased elasticity for stretching around the socket; and wherein the projecting member has a length that is sufficient to extend past the proximal interface with at least a portion of its full cross-sectional diameter located beyond a half-way point of the anvil hole's anvil hole length when the O-ring is stretched onto a socket of small size and sufficient to extend past the proximal interface when the O-ring is stretched onto a socket of large size.

\* \* \* \* \*